US012495242B2

(12) United States Patent
Li

(10) Patent No.: US 12,495,242 B2
(45) Date of Patent: Dec. 9, 2025

(54) SUSPENDED AUDIO DEVICE WITH BASS BOOST PERFORMANCE

(71) Applicant: SHENZHEN DANCING FUTURE TECHNOLOGY LTD., Shenzhen (CN)

(72) Inventor: Xinyu Li, Shenzhen (CN)

(73) Assignee: SHENZHEN DANCING FUTURE TECHNOLOGY LTD., Shenzhen (CN)

( * ) Notice: Subject to any disclaimer, the term of this patent is extended or adjusted under 35 U.S.C. 154(b) by 217 days.

(21) Appl. No.: 18/461,788

(22) Filed: Sep. 6, 2023

(65) Prior Publication Data

US 2024/0098401 A1 Mar. 21, 2024

(30) Foreign Application Priority Data

Sep. 9, 2022 (CN) ......................... 202211102602.9

(51) Int. Cl.
*H04R 1/22* (2006.01)
*H04R 3/04* (2006.01)

(52) U.S. Cl.
CPC ................. *H04R 1/22* (2013.01); *H04R 3/04* (2013.01); *H04R 2430/00* (2013.01)

(58) Field of Classification Search
None
See application file for complete search history.

(56) References Cited

U.S. PATENT DOCUMENTS 5,668,885 A * 9/1997 Oda ......................... H04R 3/04 381/98
7,394,908 B2 * 7/2008 Katou .................... G10H 1/125 381/98
8,005,233 B2 * 8/2011 Smith ...................... H04R 3/04 381/98
8,386,242 B2 * 2/2013 Kim ......................... H04R 3/04 704/226

(Continued)

FOREIGN PATENT DOCUMENTS

JP 2010237294 A 10/2010
JP 2012108411 A 6/2012
JP 7592809 B2 12/2024

OTHER PUBLICATIONS

Decision to Grant for Japanese Patent Application No. 2023-147124, mailed on Oct. 22, 2024, 5 pages.

*Primary Examiner* — Paul W Huber
(74) *Attorney, Agent, or Firm* — Astute IP Law Group

(57) ABSTRACT

Disclosed is a suspended audio device with bass enhancement performance, including a low-pass filter, a high-pass filter, an energy controller and a harmonic generator. The low-pass filter is configured to extract a low-frequency signal in an original input signal, and input the low-frequency signal as a fundamental wave of the harmonic generator; the high-pass filter is configured to extract a mid-high frequency signal in the original input signal; the harmonic generator is configured to process the low-frequency signal extracted by the low-pass filter through the (Continued)

NLD algorithm, and generate at least one enhanced harmonic signal in the low-frequency signal; the energy controller is configured to control an overall gain of the at least one enhanced harmonic signal generated by the harmonic generator.

4 Claims, 6 Drawing Sheets

(56) References Cited

U.S. PATENT DOCUMENTS

| | | | | |
|---|---|---|---|---|
| 8,615,093 | B2 * | 12/2013 | Hung | H03G 5/165 381/98 |
| 9,281,791 | B2 * | 3/2016 | Kawahara | H03G 5/005 |
| 9,438,995 | B2 * | 9/2016 | Kawano | H04R 3/04 |
| 10,750,278 | B2 * | 8/2020 | Yang | H04S 1/00 |
| 11,323,808 | B2 * | 5/2022 | Postel | H04R 3/04 |
| 11,838,732 | B2 * | 12/2023 | Mariglio, III | H04R 3/00 |
| 2009/0052695 | A1 * | 2/2009 | Yamada | H03G 9/025 381/101 |
| 2012/0020480 | A1 * | 1/2012 | Visser | H04R 3/12 381/17 |
| 2015/0092973 | A1 * | 4/2015 | Risberg | H03G 11/008 381/337 |
| 2023/0276172 | A1 * | 8/2023 | Lopez Zuleta | H04R 3/04 381/97 |

* cited by examiner

SUSPENDED AUDIO DEVICE WITH BASS BOOST PERFORMANCE

CROSS-REFERENCE TO RELATED APPLICATIONS

This application claims priority to Chinese Patent Application No. 202211102602.9, filed on Sep. 9, 2022, the entire contents of which are incorporated herein by reference.

TECHNICAL FIELD

The present application relates to a suspended audio device, and in particular to a suspended audio device with bass boost performance.

BACKGROUND

The audio range that can be heard by the human ear is 20 Hz to 20 kHz. The suspended audio device cannot use a loudspeaker with too large caliber due to the product form, cannot present low-frequency audio well, and can only reproduce audio of about 140 Hz to 20 kHz. However, an audio range of 70 Hz to 140 Hz has a significant impact on the sense of music, the music sounds simply and unsmooth without it, which can affect the user's listening experience. Traditional EQ adjustment can only be adjusted for the audio range of 140 Hz to 20 kHz, and cannot replay the sound of the low frequency band.

Therefore, the existing suspended audio device has a poor bass performance, and is limited by the size of the loudspeaker, resulting in unsatisfactory bass performance. How to improve the bass performance of the existing suspended audio device is a technical problem to be solved urgently in the related art.

SUMMARY

The main objective of the present application is to provide a suspended audio device with bass boost performance that can present low-frequency component signals through frequency shifting to improve the sound quality of a system.

In order to solve the above technical problem, the present application provides a suspended audio device with bass enhancement performance, including a low-pass filter (LPF), a high-pass filter (HPF), an energy controller and a harmonic generator. The low-pass filter is configured to extract a low-frequency signal in an original input signal, and input the low-frequency signal as a fundamental wave of the harmonic generator; the high-pass filter is configured to extract a mid-high frequency signal in the original input signal; the harmonic generator is configured to process the low-frequency signal extracted by the low-pass filter through the Non-Linear Device (NLD) algorithm, and generate an enhanced harmonic signal in the low-frequency signal; the energy controller is configured to control an overall gain of the harmonic signal generated by the harmonic generator.

In an embodiment, the harmonic generator is configured to generate two-path harmonic signals.

In an embodiment, the suspended audio device further includes a delayer, and the delayer is configured to perform delay processing before adding the two-path harmonic signals to ensure that the two-path harmonic signals remain consistent before adding.

In an embodiment, the energy controller includes a gain controller G1 and a gain controller G2, and the gain controller G1 and the gain controller G2 are respectively configured to control the gains of the two-path harmonic signals.

In the suspended audio device with bass enhancement performance according to the present application, the low-pass filter is first used to extract the low-frequency signal in the original input signal, and for the mid-high frequency band, the high-pass filter is used to extract the mid-high frequency signal in the original input signal. During the specific enhancement processing, the harmonic generator processes the low-frequency signal extracted by the low-pass filter through the preset NLD algorithm, and generates at least one enhanced harmonic signal in the low-frequency signal. Finally, the energy controller controls the overall gain of the at least one enhanced harmonic signal generated by the harmonic generator. Compared with the related art, the present application moves the low-frequency band that cannot be presented by an audio system to the frequency band that can be presented by the audio system, thereby improving the overall sound quality of the system and enabling the suspended audio device to have bass enhancement performance, which better meets application requirements.

DETAILED DESCRIPTION OF THE EMBODIMENTS

The present application will be described in more detail below in conjunction with the accompanying drawings and embodiments.

Figure 1:
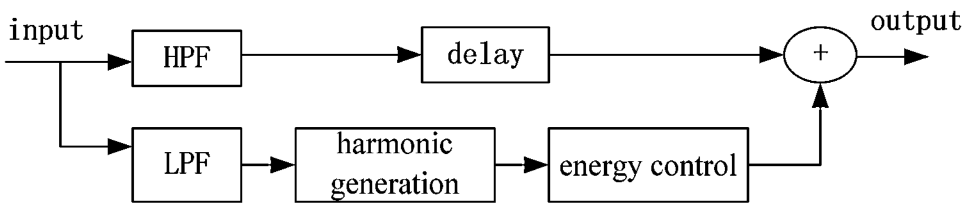
FIG. 1 is a block diagram of the principle of a suspended audio device with bass boost performance according to the present application.
Figure 2:
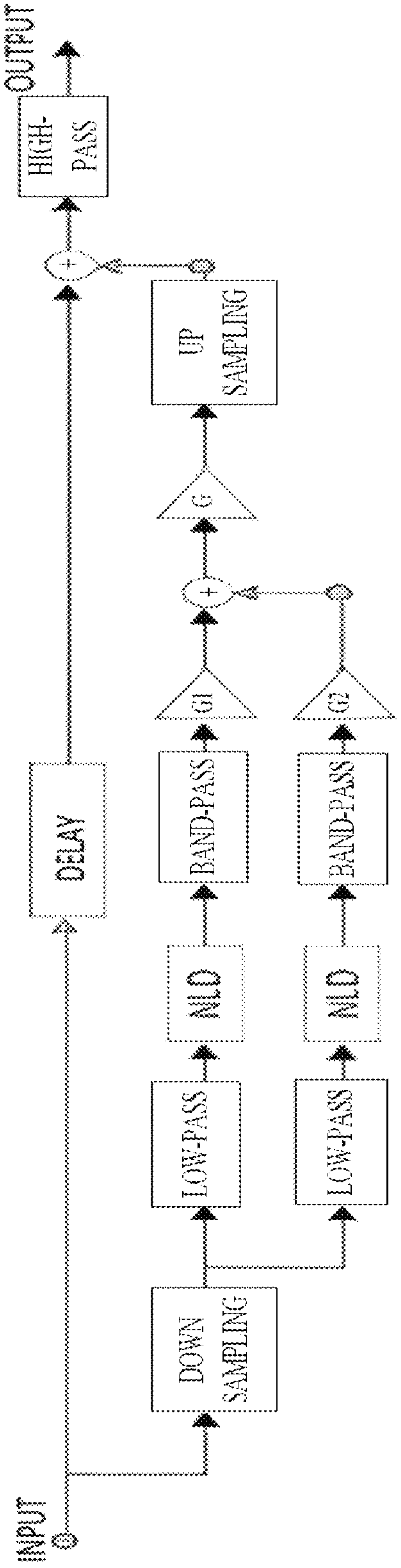
FIG. 2 is a flowchart of harmonic generation process.

The present application discloses a suspended audio device with bass enhancement performance. As shown in FIGS. 1 and 2, the suspended audio device includes a low-pass filter, a high-pass filter, an energy controller and a harmonic generator. The low-pass filter is configured to extract a low-frequency signal in an original input signal, and input the low-frequency signal as a fundamental wave of the harmonic generator. The high-pass filter is configured to extract mid-high frequency band signals in the original input signal. The harmonic generator is configured to process the low-frequency signal extracted by the low-pass filter through Non-Linear Device (NLD) algorithm processing, and generate an enhanced harmonic signal in the low-frequency signal. The energy controller is configured to control an overall gain of the harmonic signal generated by the harmonic generator.

In the above device, the low-pass filter is first used to extract the low-frequency signal in the original input signal. For the mid-high frequency band, the high-pass filter is used to extract the mid-high frequency signals in the original input signal. During the specific enhancement processing, the harmonic generator processes the low-frequency signal extracted by the low-pass filter through the preset NLD algorithm, and generates the enhanced harmonic signal in the low-frequency signal. Finally, the energy controller controls the harmonic generator to generate the overall gain of the harmonic signal. Compared with the related art, the present application moves the low-frequency band that cannot be presented by the audio system to the frequency band that can be presented by the audio system, thereby improving the overall sound quality of the system, enabling the suspended audio device to have bass enhancement performance, and better meeting application requirements.

In this embodiment, the harmonic generator is configured to generate two-path harmonic signals. The energy controller includes a gain controller G1 and a gain controller G2, and the gain controller G1 and the gain controller G2 are respectively used to control the gains of the two-path harmonic signals.

Specifically, the harmonic generator is a non-linear component, which is used to generate the desired harmonic signal. Due to the better effect of using two-path harmonic generation in an experiment, the two-path harmonic generation is used in actual implementation, and their respective gains are controlled through G1 and G2, respectively. Finally, G is used for overall harmonic gain control. The up sampling module and down sampling module are mainly to reduce the calculation amount of the system and reduce the power consumption of the system. In addition, since the NLD module can generate more redundant low-frequency signals, and these low-frequency signals cannot be reproduced by small loudspeakers, can cause cracking voice and need to be filtered out, the high-pass filter is provided finally.

Further, this embodiment includes a delayer, which is used to perform delay processing before the addition of the two-path harmonic signals, so as to ensure that the two-path signals are consistent before the addition. Due to the delay characteristics of the linear FIR filter, it is necessary to delay the signals appropriately before the addition of the two-path harmonic signals to ensure that the two-path harmonic signals remain consistent before adding.

Figure 6:
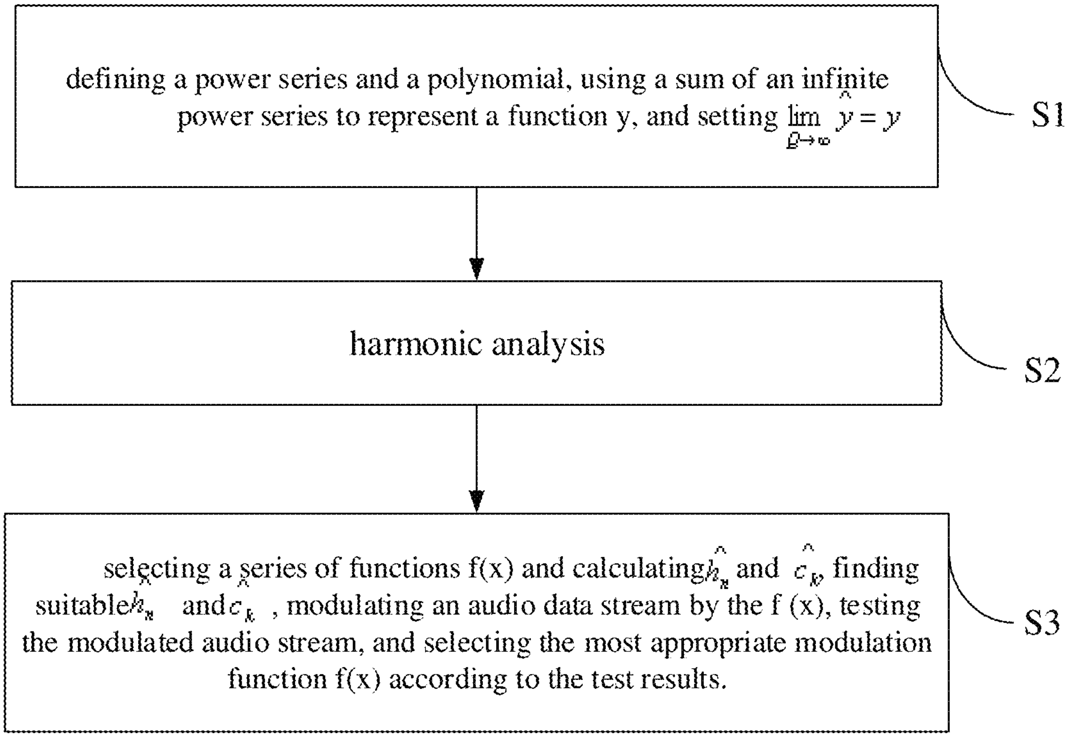
FIG. 6 is a flow chart of a Non-Linear Device (NLD) algorithm.

In an embodiment, as shown in FIG. 6, the NLD algorithm adopted in the harmonic generator includes the following steps:

step S1, defining a power series and a polynomial, using a sum of an infinite power series to represent a function y:

$$y = f(x) = \sum_{n=0}^{\infty} h_n x^n, \tag{2.1}$$

where $h_n$ represents a coefficient of the nth power series, and x and y represent an input and output, respectively.

In practical applications, since the computer system cannot handle infinite items and infinite power series, y is expressed approximately by using an finite item and an finite power series ŷ.

$$\hat{y} = \hat{f}(x) = \sum_{n=0}^{Q} \hat{h}_n x^n, \tag{2.2}$$

Setting $$\lim_{Q\to\infty} \hat{y} = y,$$

and Q represents the highest order.

Step S2, harmonic analysis:

defining a single-tone signal with an initial phase set to 0:

$$x(t) = A\cos(wt), \tag{2.3}$$

where A represents amplitude, w represents angular velocity in radians per second, and t represents time in seconds;

substituting formula (2.3) into formula (2.2) to get:

$$\hat{g}(t) = \frac{\hat{c}_o}{2} + \sum_{k=1}^{P} \hat{c}_k \cos(kwt). \tag{2.4}$$

P is an upper bound of a harmonic order, $\hat{c}_k$ is the coefficient of a finite Fourier series and is also the amplitude of the kth harmonic, and $$\frac{\hat{c}_o}{2}$$

is a direct current component.

The relationship between $\hat{c}_k$ and $\hat{h}_n$ can be derived from formulas (2.2) and (2.4):

$$\hat{c}_k = \hat{\mathfrak{J}}_a(A, \hat{h}_n) = \frac{1}{2^{k-1}} \sum_{j=0}^{L_j[(Q-k)/2]} \frac{A^{k+2j}\hat{h}_n}{2^{2j}} \binom{k+2j}{j}, \tag{2.5}$$

where $n = k + 2j$, and $k = 0, 1, 2, \ldots, (L_k = Q)$;

$$\hat{h}_n = \hat{\mathcal{J}}_s(A, \hat{c}_k) = \frac{2^{n-1}}{A^{n-1}} \sum_{j=0}^{L_j[(P-n)/2]} (-1)\frac{n+2j}{n+j}\binom{n+j}{j}\hat{c}_k, \tag{2.6}$$

where $k = n + 2j$, and $n = 0, 1, 2, \ldots, (L_n = P)$.

According to formula (2.5), for the coefficient $\hat{h}_n$ of the existing power series, the amplitudes of each harmonic component contained thereof can be analyzed. According to formula (2.6), the amplitude coefficients $\hat{c}_k$ of each harmonic component can be constructed to calculate the corresponding coefficients $\hat{h}_n$ of the power series.

After obtaining $\hat{h}_n$, substituting the $\hat{h}_n$ into the formula (2.1) and making calculations to obtain the harmonic.

Step S3, selecting a series of functions f(x) and calculating $\hat{h}_n$ and $\hat{c}_k$, finding suitable $\hat{h}_n$ and $\hat{c}_k$. An audio data stream is modulated by the above f(x) on the product, the modulated audio stream is subjectively and objectively tested, and the most appropriate modulation function f(x) is selected according to the test results.

Figure 3:
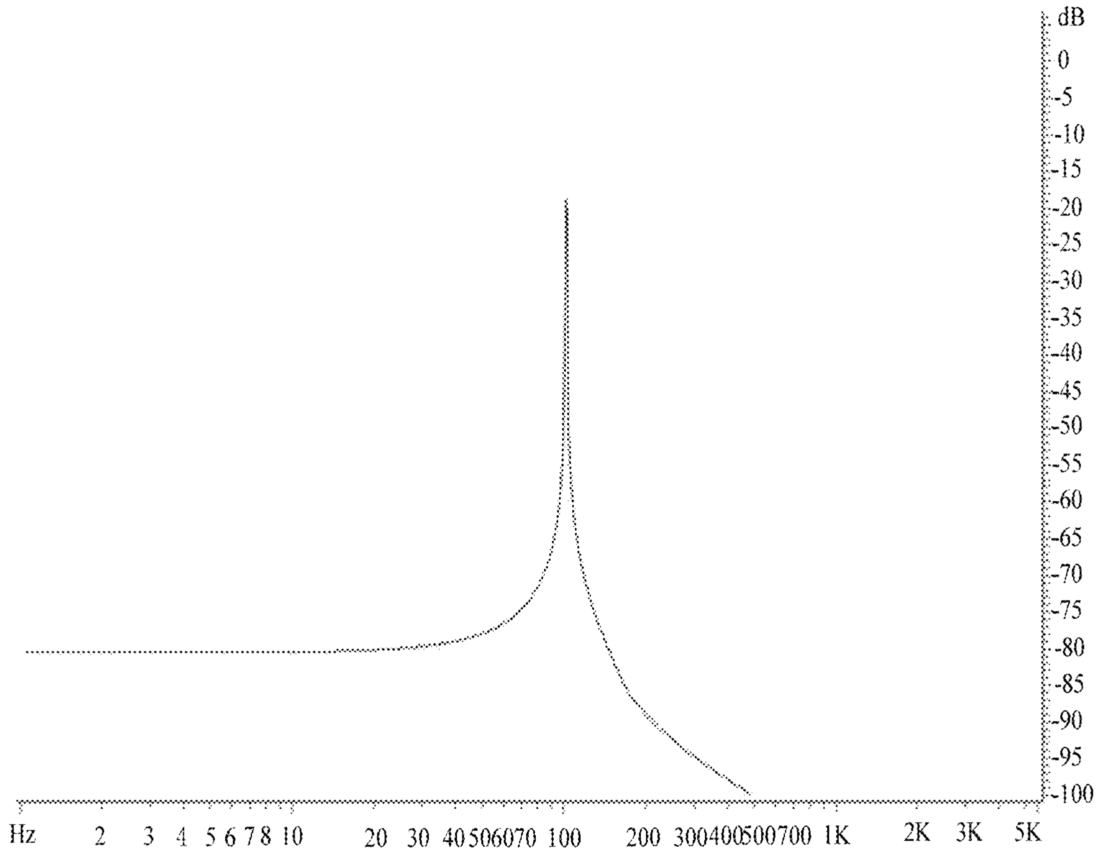
FIG. 3 is a curve graph of a frequency domain of a 100 Hz pure tone input signal.
Figure 4:
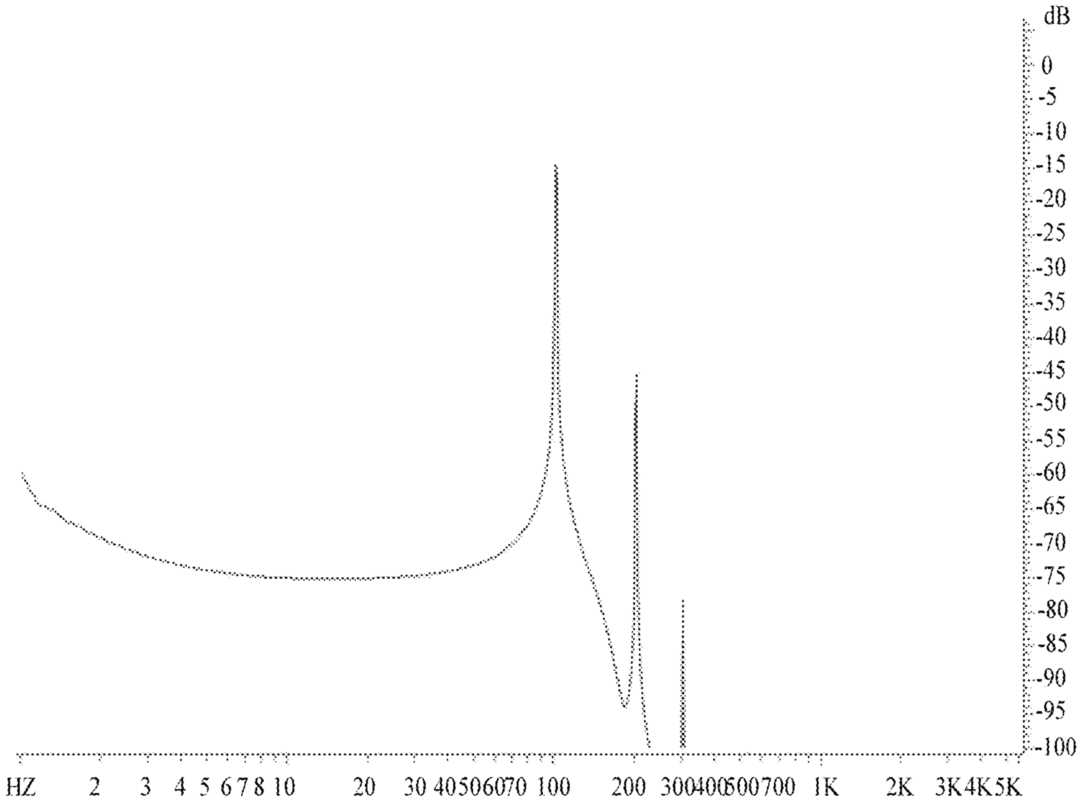
FIG. 4 is a curve graph of an output frequency domain after NLD algorithm processing.

For the experimental results of the technical solution of the present application, two experiments are as follows:

Experiment 1: with a 100 Hz pure tone signal as an input, using Matlab to simulate. Inputting the 100 Hz pure tone signal is shown in FIG. 3, and generating the harmonic signal through an NLD algorithm is shown in FIG. 4. As shown in FIG. 4, with the frequency of 100 Hz as the fundamental wave, the desired second and third harmonics are generated at 200 Hz and 300 Hz, respectively, and from the hearing perspective, the generated second and third harmonics have an enhancing effect on the fundamental wave.

Figure 5:
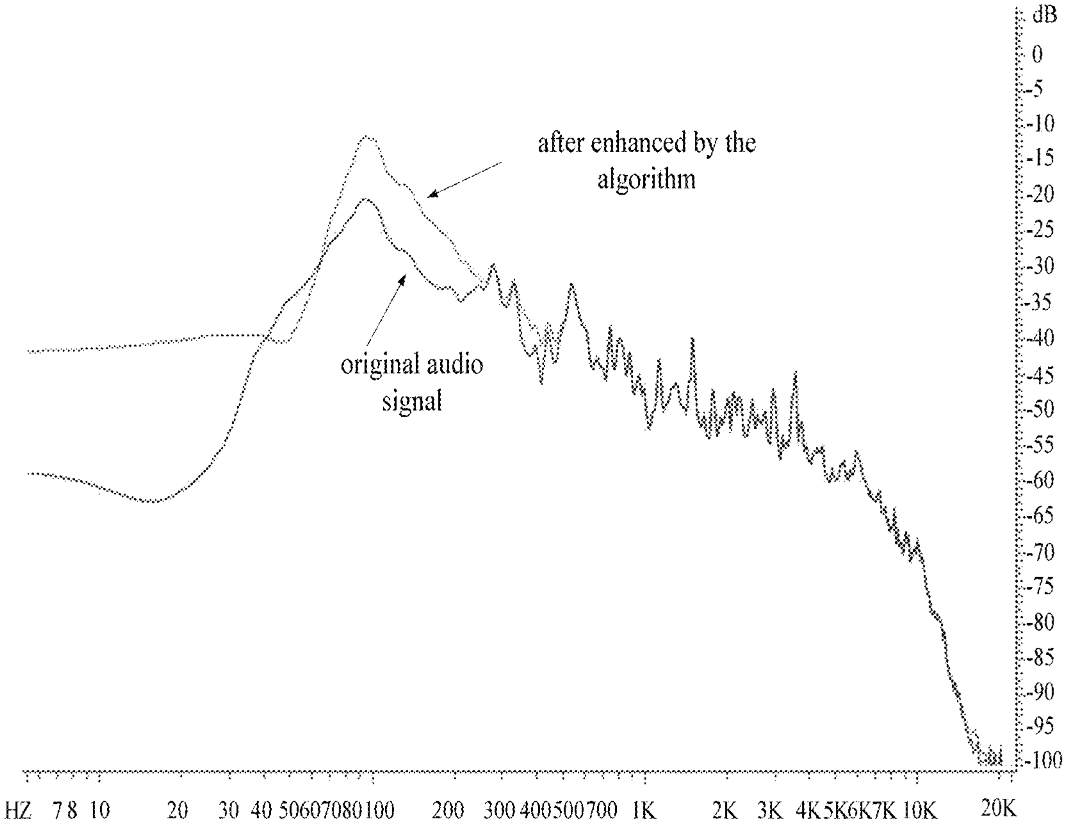
FIG. 5 is a comparison diagram between a music input signal and an output spectrum curve of virtual bass algorithm.

Experiment 2: with a music signal as an input, using Matlab to simulate, inputting the music signal, and observing the spectrum changes between the output music signal and the input music signal. As shown in FIG. 5, from the comparison between before and after enhanced by the virtual bass algorithm, the harmonic signal generated after enhanced by the algorithm is obvious. From the aspect of actual hearing, the audio signal processed by the algorithm has a significantly enhanced bass effect, therefore the virtual bass algorithm of the present application is effective.

Compared with the related art, the suspended audio device according to the present application has the bass enhancement performance. In an open earphone, it is inevitable to use a small-size loudspeaker, which has limited or missing ability to reproduce bass, and the bass leakage is more serious than that of an in-ear or semi-in-ear earphone due to the open form of the earphone, therefore it is very important to realize the bass enhancement of the open earphone and improve the listening feeling of music. In the application scenario of the present application, the effect of enhancing the bass through the traditional EQ adjusting method is poor, and even overload and damage of the loudspeaker can be caused. Therefore, the virtual bass algorithm based on NLD according to the present application can achieve better virtual bass enhancement in headphone systems with limited computing resources, improve the listening experience of music, and bring better music enjoyment to users.

The above descriptions are only preferred embodiments of the present application and are not intended to limit the present application. Any modifications, equivalents or improvements made within the technical scope of the present application should be included in the scope of the present application.

What is claimed is:

1. An audio device with bass enhancement performance, comprising:

a low-pass filter configured to extract a low-frequency signal in an original input signal and input the low-frequency signal as a fundamental wave of a harmonic generator;

a high-pass filter configured to extract a mid-high frequency signal in the original input signal;

the harmonic generator configured to process the low-frequency signal extracted by the low-pass filter through a Non-Linear Device (NLD) algorithm, and generate at least one enhanced harmonic signal in the low-frequency signal; and an energy controller configured to control an overall gain of the at least one enhanced harmonic signal generated by the harmonic generator;

wherein the NLD algorithm adopted in the harmonic generator comprises:

step S1, defining a power series and a polynomial, using a sum of an infinite power series to represent a function y:

$$y = f(x) = \sum_{n=0}^{\infty} h_n x^n, \tag{2.1}$$

where $h_n$ represents a coefficient of the nth power series, and x and y represent an input and output, respectively, y is expressed approximately by using finite items and finite power series $\hat{y}$, $$\hat{y} = \hat{f}(x) = \sum_{n=0}^{Q} \hat{h}_n x^n, \tag{2.2}$$

and setting $$\lim_{Q\to\infty} \hat{y} = y,$$

wherein Q represents the highest order;

step S2, harmonic analysis:

defining a single-tone signal with an initial phase set to 0:

$$x(t) = A\cos(wt), \tag{2.3}$$

where A represents amplitude, w represents angular velocity in radians per second, and t represents time in seconds, substituting formula (2.3) into formula (2.2) to get:

$$\hat{g}(t) = \frac{\hat{c}_0}{2} + \sum_{k=1}^{P} \hat{c}_k \cos(kwt), \tag{2.4}$$

where P is an upper bound of a harmonic order, $\hat{c}_k$ is the coefficient of an finite Fourier series and is also the amplitude of the kth harmonic, and $$\frac{\hat{c}_o}{2}$$

is a direct current component, deriving the relationship between $\hat{c}_k$ and $\hat{h}_n$ from formulas (2.2) and (2.4);

$$\hat{c}_k = \hat{\mathcal{J}}_a(A, \hat{h}_n) = \frac{1}{2^{k-1}} \sum_{j=0}^{L_j=[(Q-k)/2]} \frac{A^{k+2j}\hat{h}_n}{2^{2j}} \binom{k+2j}{j}, \tag{2.5}$$

where $n = k + 2j$, and $k = 0, 1, 2, \ldots, (L_k = Q)$;

$$\hat{h}_n = \hat{\mathcal{J}}_s(A, \hat{c}_k) = \frac{2^{n-1}}{A^{n-1}} \sum_{j=0}^{L_j=[(P-n)/2]} (-1)^j \frac{n+2j}{n+j} \binom{n+j}{j} \hat{c}_k, \tag{2.6}$$

where k=n+2j, and n=0,1,2 . . . , ($L_n$=P), according to formula (2.5), for the coefficient $\hat{h}_n$ of the existing power series, analyzing the amplitudes of each harmonic component contained thereof, and according to formula (2.6), constructing the amplitude coefficients $\hat{c}_k$ of each harmonic component to calculate the corresponding coefficients $\hat{h}_n$ of the power series, and substituting $\hat{h}_n$ into the formula (2.1) after obtaining $\hat{h}_n$ and making calculations to obtain the harmonic; and step S3, selecting a series of functions f(x) and calculating $\hat{h}_n$ and $\hat{c}_k$ finding suitable $\hat{h}_n$ and $\hat{c}_k$, modulating an audio data stream by the f(x), testing the modulated audio stream, and selecting the most appropriate modulation function f(x) according to the test results.

2. The audio device with bass enhancement performance according to claim 1, wherein the harmonic generator is configured to generate two-path harmonic signals.

3. The audio device with bass enhancement performance according to claim 2, further comprising a delayer configured to perform delay processing before adding the two-path harmonic signals to ensure that the two-path harmonic signals remain consistent before adding.

4. The audio device with bass enhancement performance according to claim 2, wherein the energy controller comprises a gain controller G1 and a gain controller G2, and the gain controller G1 and the gain controller G2 are respectively configured to control the gains of the two-path harmonic signals.

* * * * *